United States Patent [19]

Hsia

[11] Patent Number: 5,724,799
[45] Date of Patent: Mar. 10, 1998

[54] FRUIT PICKER

[76] Inventor: Chih-Yu Hsia, 301 Warren Way, Arcadia, Calif. 91007

[21] Appl. No.: 587,481

[22] Filed: Jan. 17, 1996

[51] Int. Cl.⁶ .................................................. A01D 46/24
[52] U.S. Cl. .................................................... 56/339
[58] Field of Search .......................... 56/340, 339, 337, 56/338, 334, 336, 333, 335

[56] References Cited

U.S. PATENT DOCUMENTS

| | | | |
|---|---|---|---|
| 2,113,518 | 4/1938 | Ruppee | 56/339 |
| 3,323,297 | 6/1967 | Conradt | 56/339 |
| 3,449,896 | 6/1969 | Burgess | 56/339 |
| 3,855,765 | 12/1974 | Forkner et al. | 56/340 |
| 4,531,352 | 7/1985 | Henningsgaard | 56/336 |
| 4,835,955 | 6/1989 | Gaubis | 56/333 |
| 4,928,461 | 5/1990 | King | 56/332 X |
| 4,959,949 | 10/1990 | Wier | 56/328.1 |
| 5,083,418 | 1/1992 | Reece | 56/239 |
| 5,099,637 | 3/1992 | Drusiani | 56/332 |
| 5,142,854 | 9/1992 | Chua | 56/335 |
| 5,249,412 | 10/1993 | Morgan | 56/334 |
| 5,253,466 | 10/1993 | Chua | 56/335 |
| 5,280,697 | 1/1994 | Miller | 56/329 |
| 5,347,800 | 9/1994 | Morgan | 56/335 |
| 5,386,682 | 2/1995 | Rodman | 56/338 |

Primary Examiner—Terry Lee Melius

[57] ABSTRACT

In apparatus to facilitate picking of fruits, one combination comprising a pole, a rigid basket which is mounted on the pole, and a cutter which is a plate having a cutting wedge or cutting wedges and which is mounted transversely on a side wall of the basket; another combination comprising a pole, a cutter mounting device which is clamped onto one end of the pole, a cutter which is a plate having a cutting wedge or cutting wedges and which is mounted on the cutter mounting device, a fruit holder mounting device which is mounted on the cutter mounting device, and a fruit holder which is a bag made of flexible material and which is mounted onto the fruit holder mounting device.

14 Claims, 21 Drawing Sheets

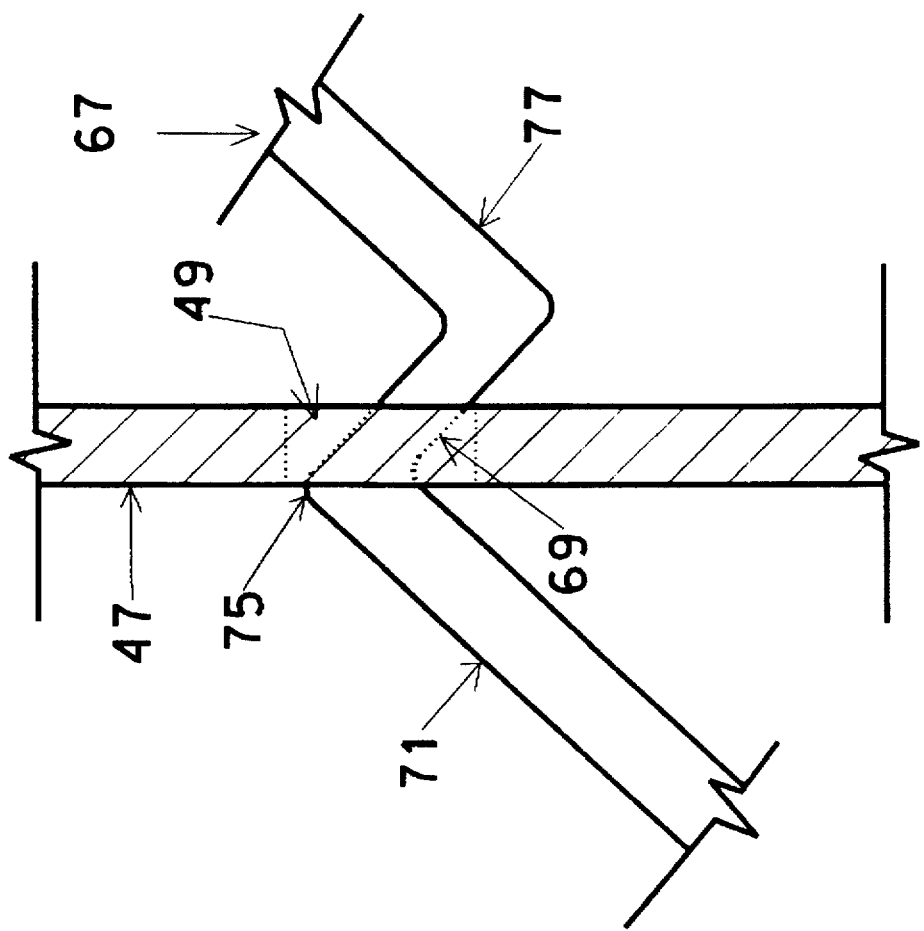
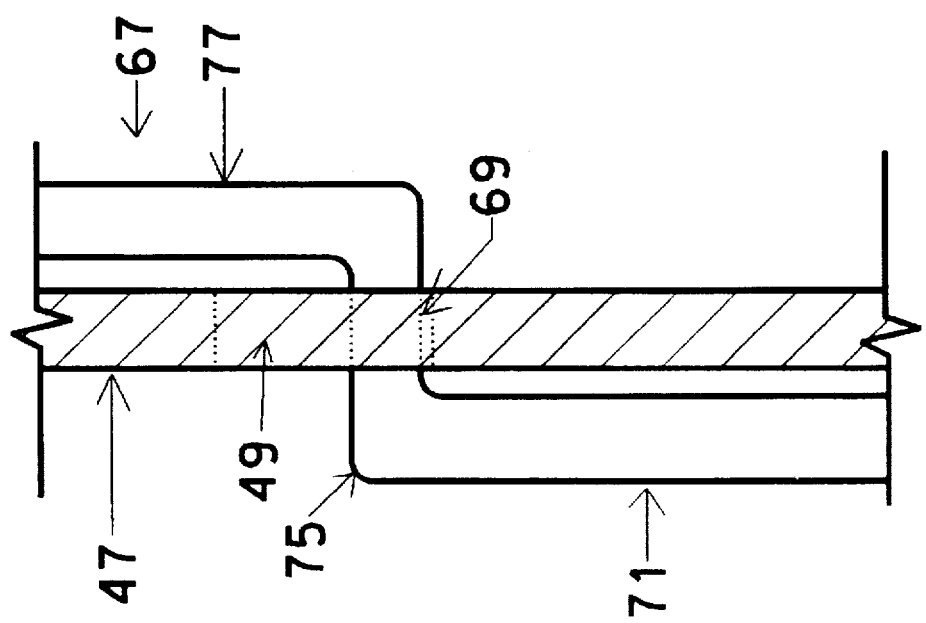

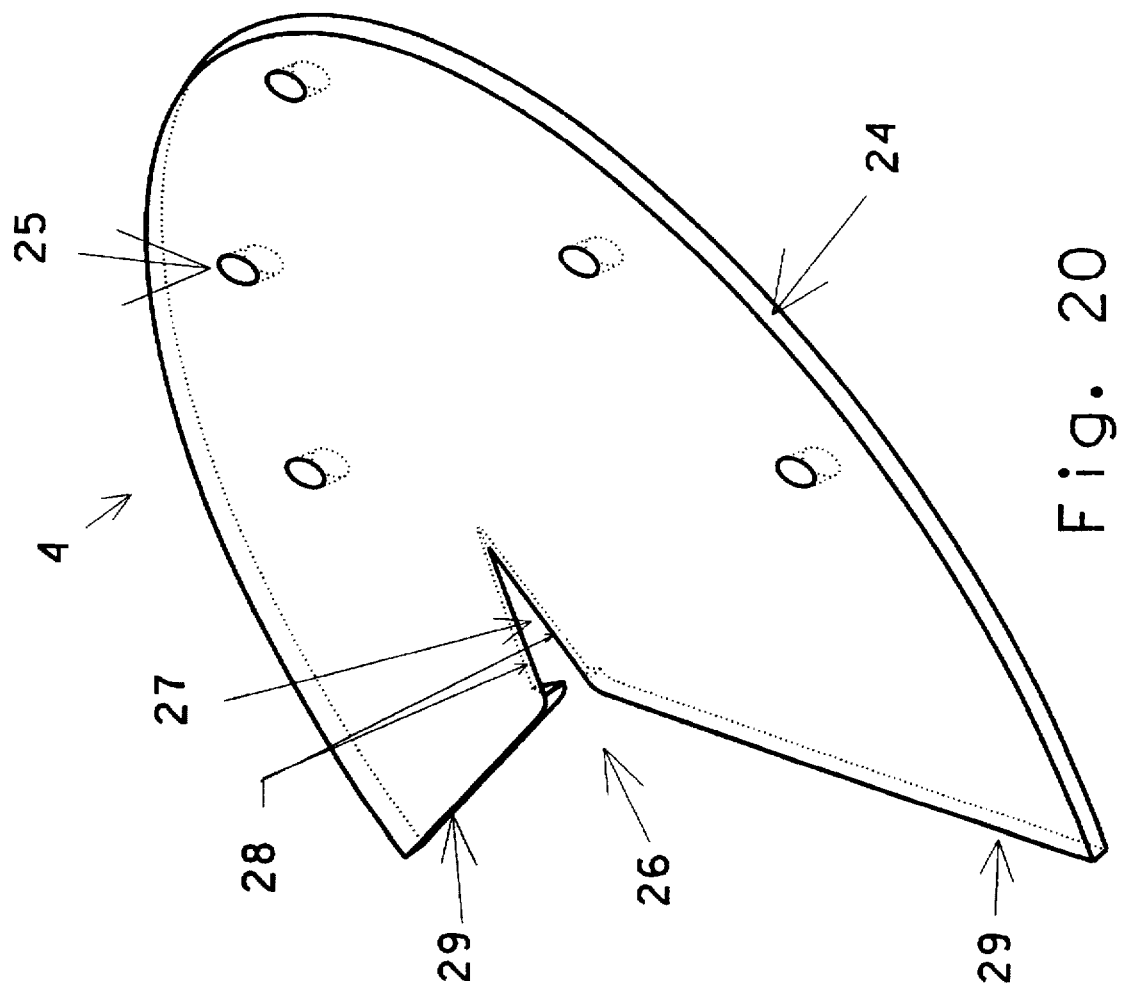

1
FRUIT PICKER

BACKGROUND OF THE INVENTION

1. Field of the Invention

The invention relates to an improved fruit picking device and particularly to a fruit picker which is mounted on a pole, is hand-operated and has a container for receiving the fruits removed from a tree or trees.

2. Description of the Prior Art

Various hand-operated fruit picking devices have been indicated in the prior arts such as U.S. Pat. Nos. 4,531,352; 4,835,955; 4,959,949; 5,083,418; 5,142,854; 5,249,412; 5,253,466; 5,280,697; 5,347,800, and 5,386,682. Except for one claim of the U.S. Pat. No. 4,959,949, each of the cited prior art consists of a stationary portion and a movable portion for their fruits cutting devices or cutters. The U.S. Pat. No. 4,959,949 does not have a cutter to facilitate fruit pickings. The present invented device has a cutter which does not have any movable portion.

SUMMARY OF THE INVENTION

Two kinds of the invented devices are introduced. Basically, the first kind of the invented apparatus comprises a) a pole;

b) a basket;

c) and a cutter which is a plate having a cutting wedge consisting of at least one knife edge;

d) one end of the pole connecting to the bottom of the basket;

e) the cutter being mounted on the rim of the basket with the cutting wedge in the basket and with the cutter partially blocking the opening of the basket.

The second kind of the invented device comprises:

a) a pole;

b) a cutter mounting device, which is a strip of suitable material with a bent section on one end;

c) one end of the pole connecting to one end of the cutter mounting device;

d) a cutter, which is a plate having a cutting wedge on one edge and a narrowed section on an opposite edge;

e) the cutting wedge consisting of at least a knife edge;

f) the narrowed section of the cutter connecting to the bent section of the cutter mounting device;

g) a fruit holder mounting device, which has a top frame and a bottom frame;

h) the bottom frame being mounted on one end of each of two mounting legs which are rods with bends;

i) the other end of each of the mounting legs connecting to the cutter mounting device;

j) the bottom frame of the fruit holder mounting device being a hoop having "L"-shaped crosssection;

k) the top frame of the fruit holder mounting device being a hoop which can engage with the "L"-shaped crosssection of the bottom frame of the fruit holder mounting device;

l) and a fruit holder, which is a bag made of flexible material and which is clamped onto the fruit holder mounting device by the top frame and the bottom frame of the fruit holder mounting device.

The second kind of the invented device has a removable fruit holder. For both kinds of the invented device, their cutters can have multiple cutting wedges.

These and other objects and advantages of the invention, as well as the details of illustrative embodiments, will be more fully understood from the following specification and drawings, in which:

DRAWING DESCRIPTION

The invention is illustrated by reference to the accompanying drawings, in which.

Figure 1:
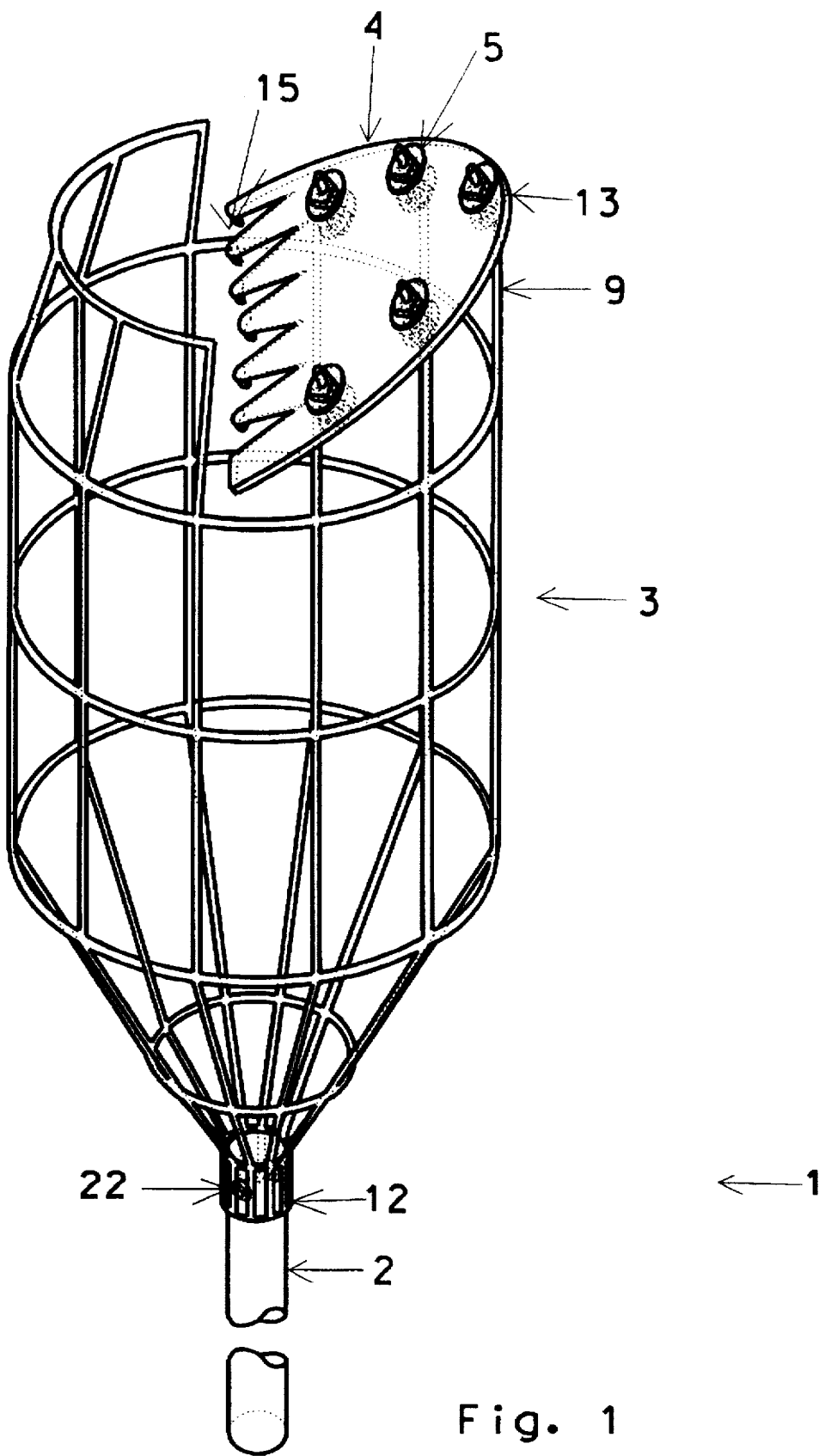
FIG. 1 is a perspective view of the invented fruit picker of the first kind.
Figure 4:
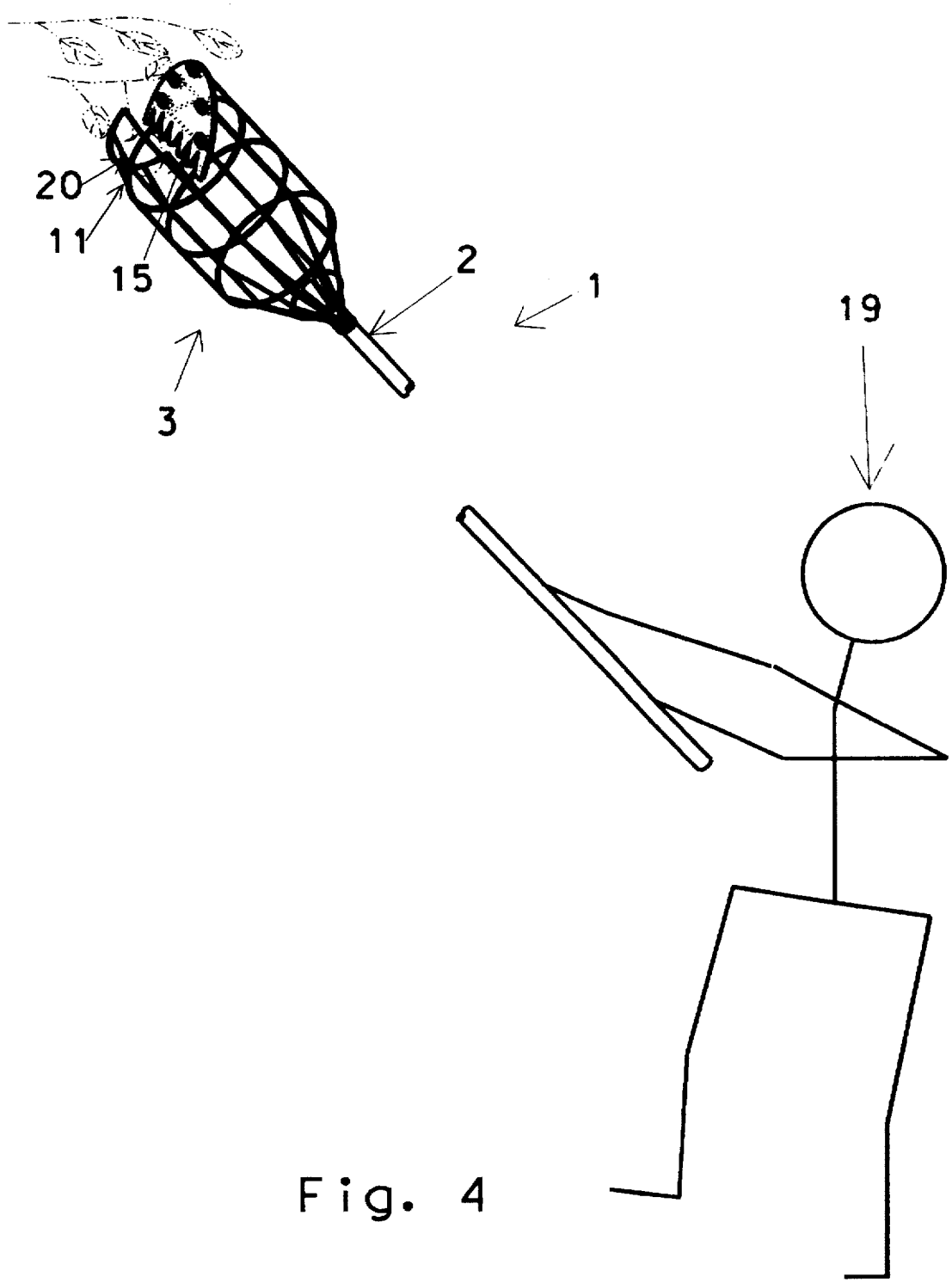
Figure 5:
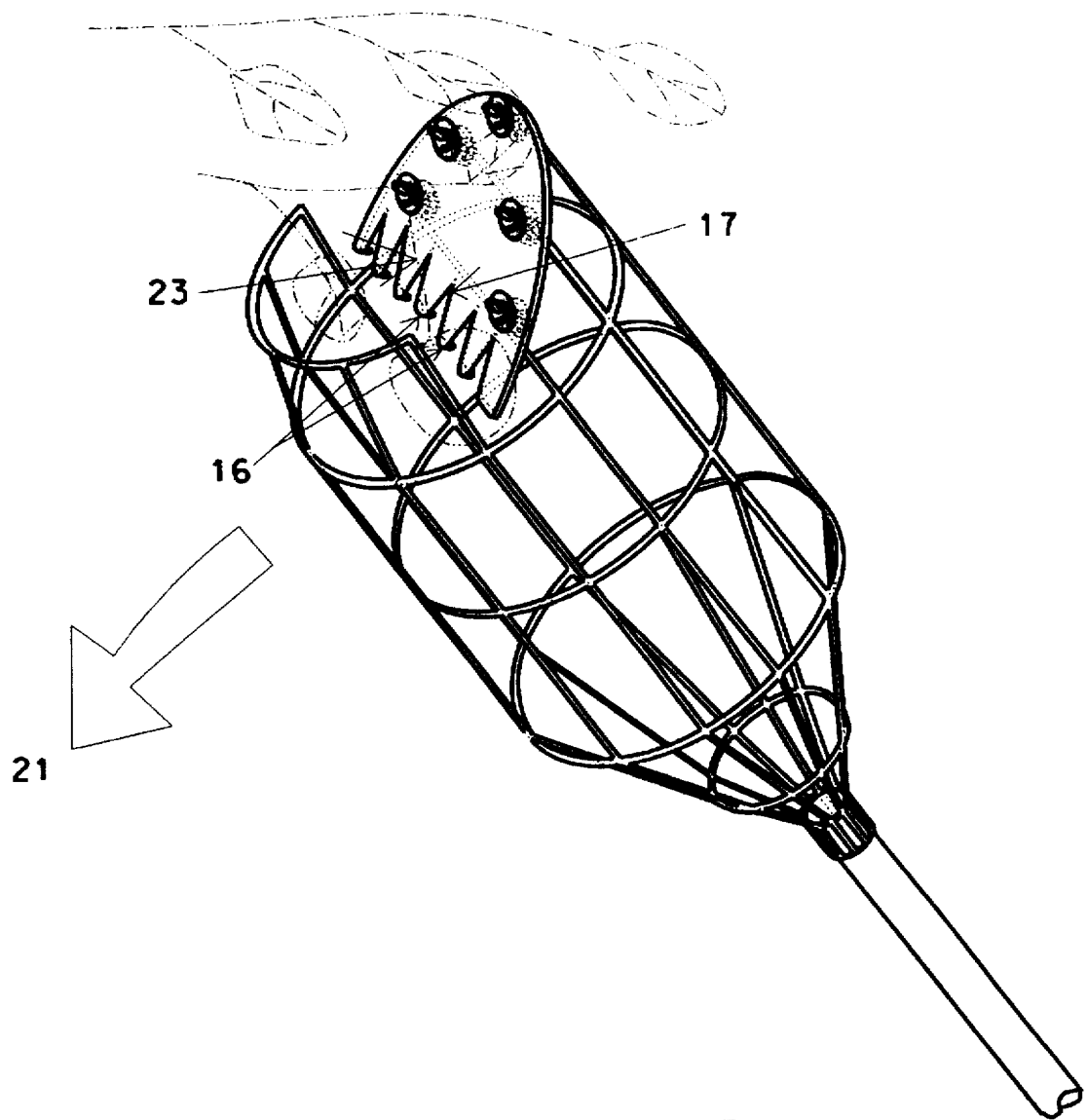
Figure 6:
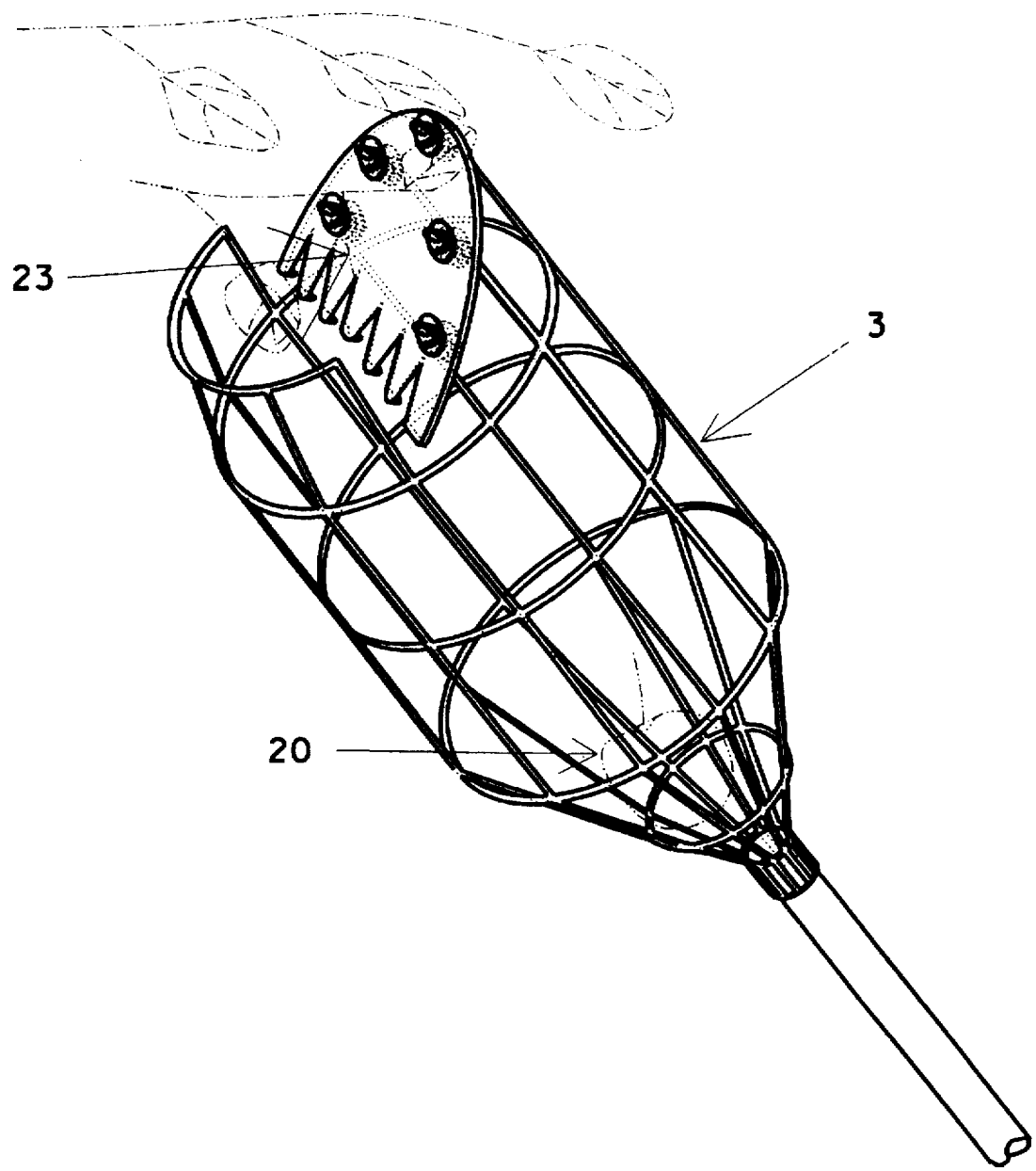

FIGS. 4, 5 and 6 are perspective views which sequentially illustrate the use of the invented device shown in FIG. 1. FIG. 4 shows the full embodiment of the invented device shown in FIG. 1 and a schematic of a user. FIGS. 5 and 6 show only a portion of the invented device to illustrate its use.

Figure 7:
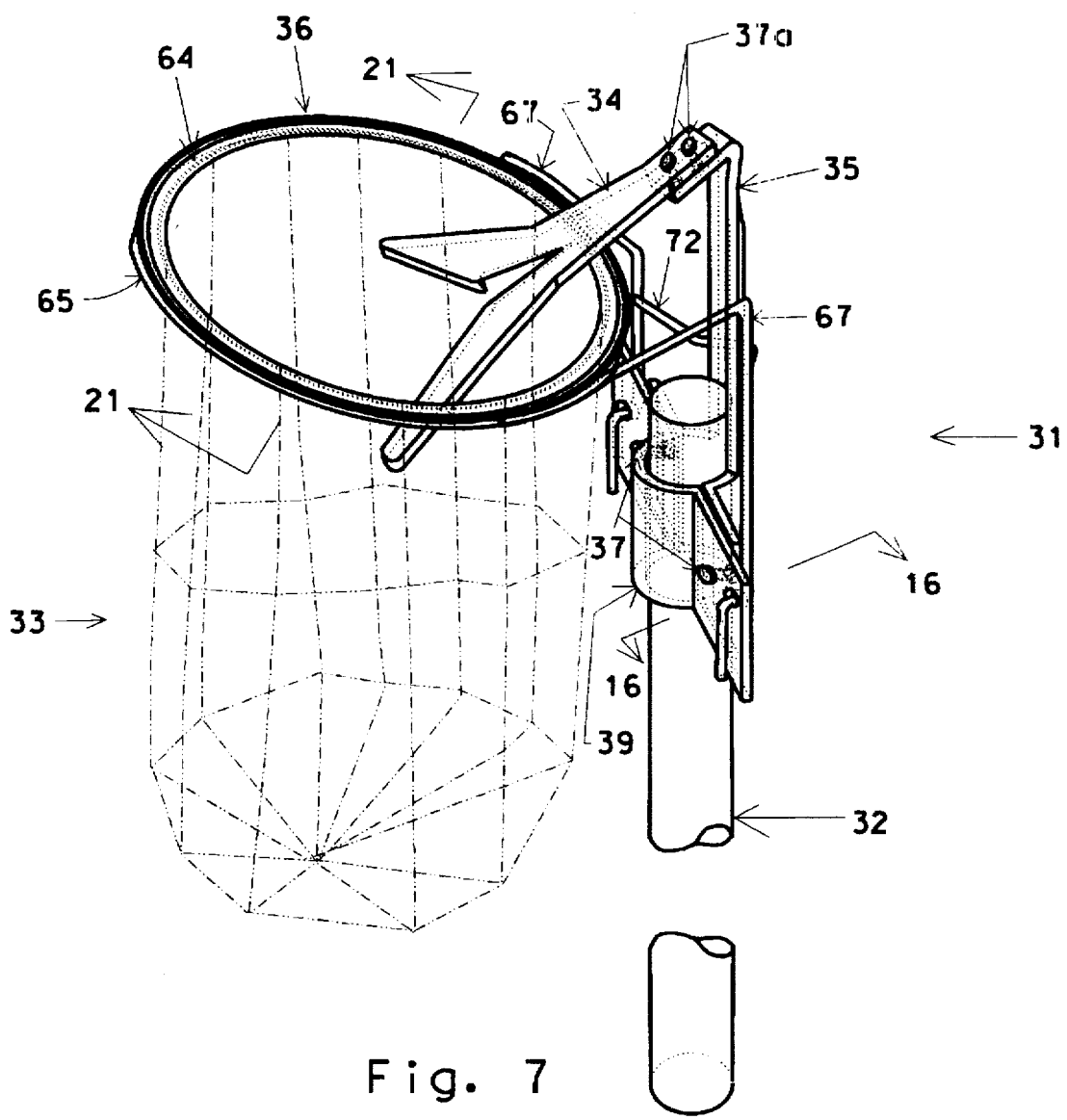
Figure 14:
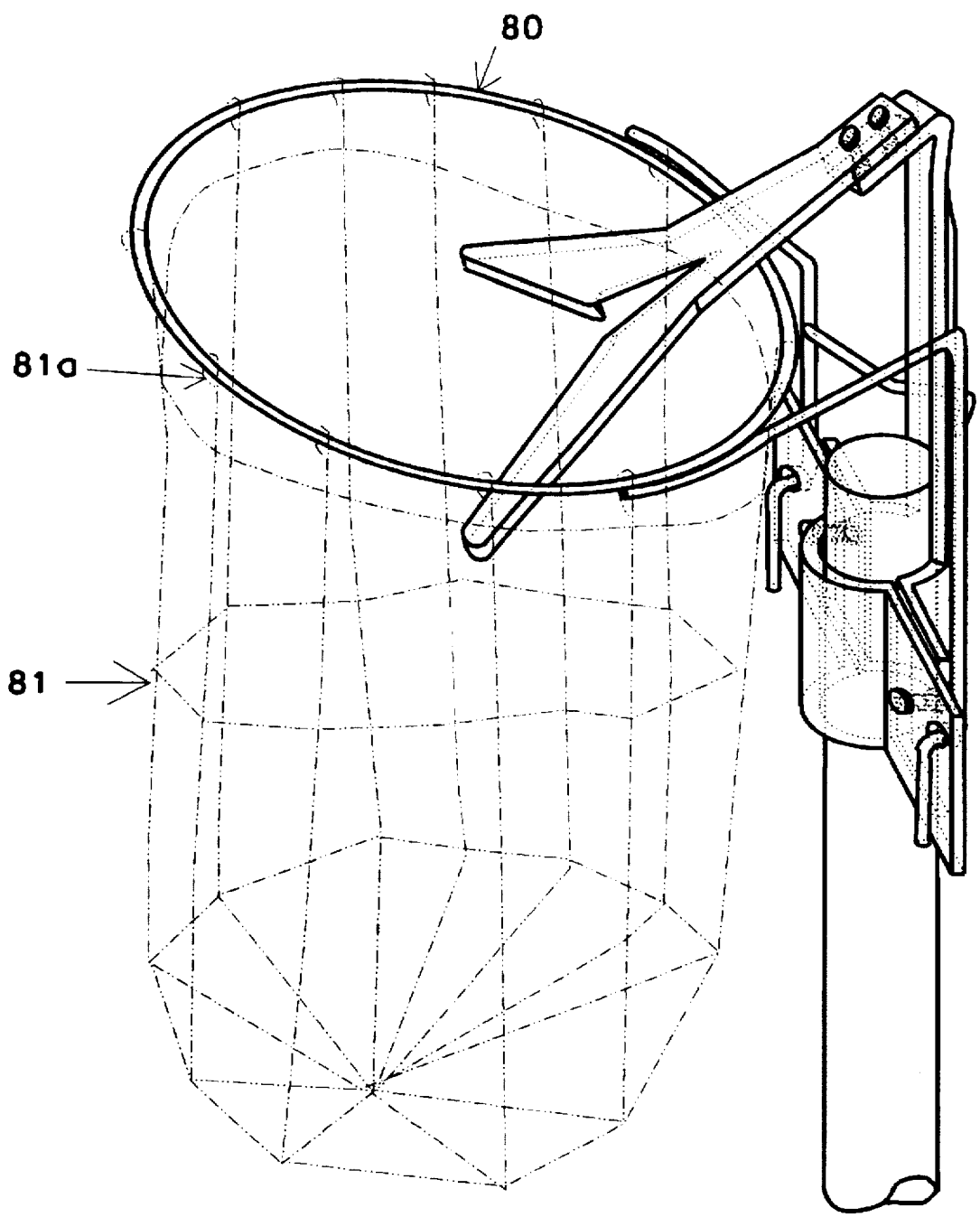
Figure 15:
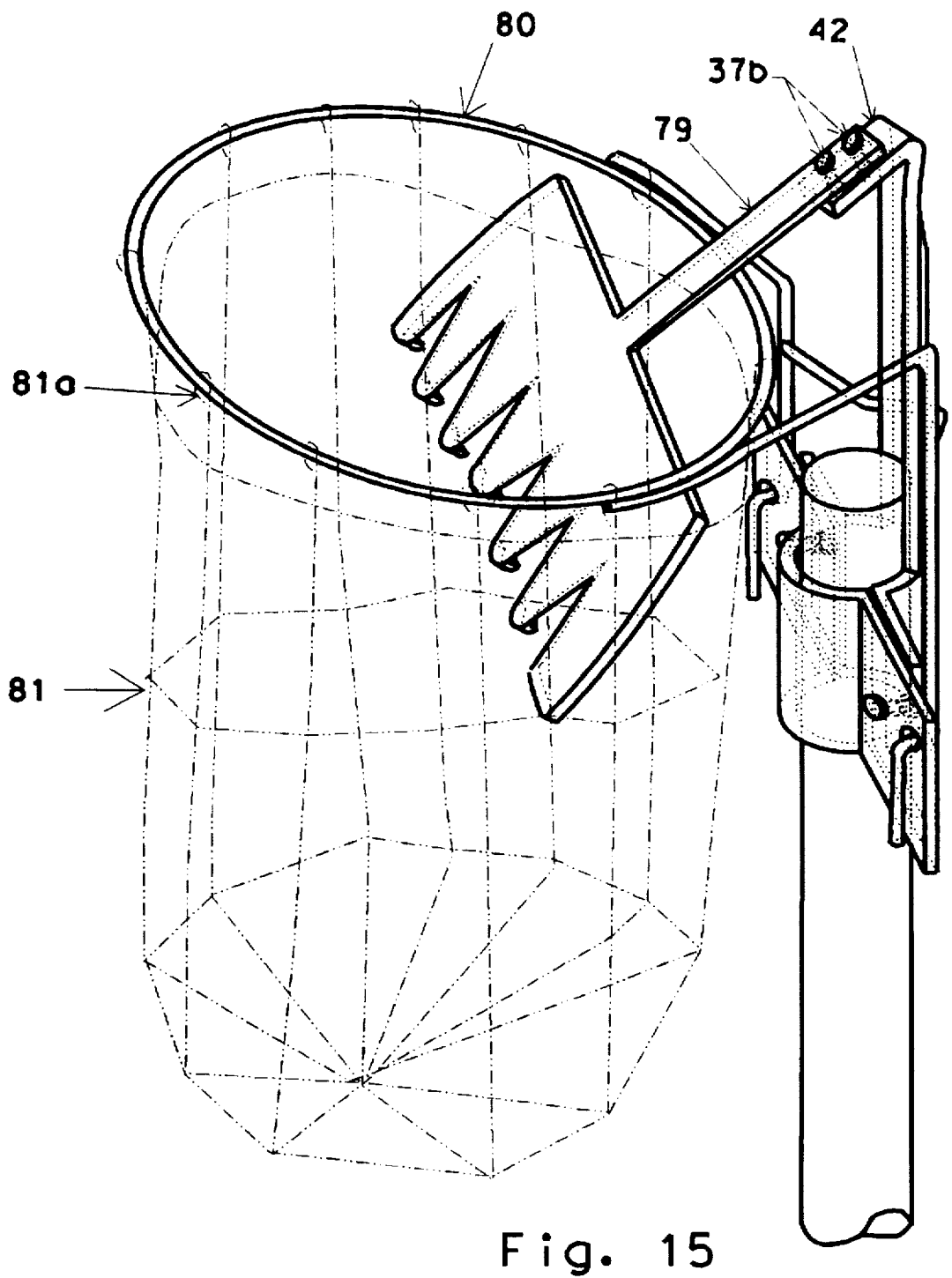

FIGS. 7, 14 and 15 are perspective views of the invented fruit picker of the second kind. Each figure shows one variation of the invented fruit picker of the second kind.

Figure 8:
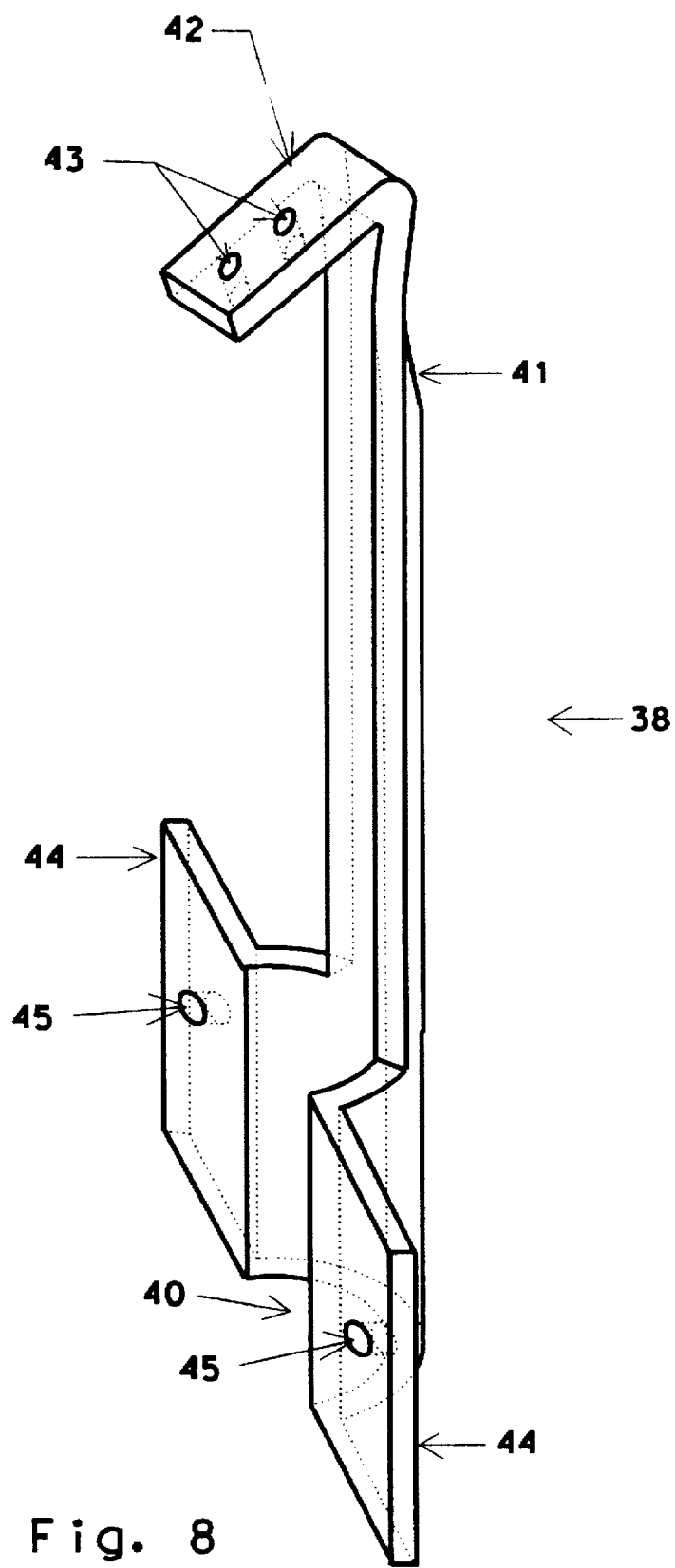
Figure 9:
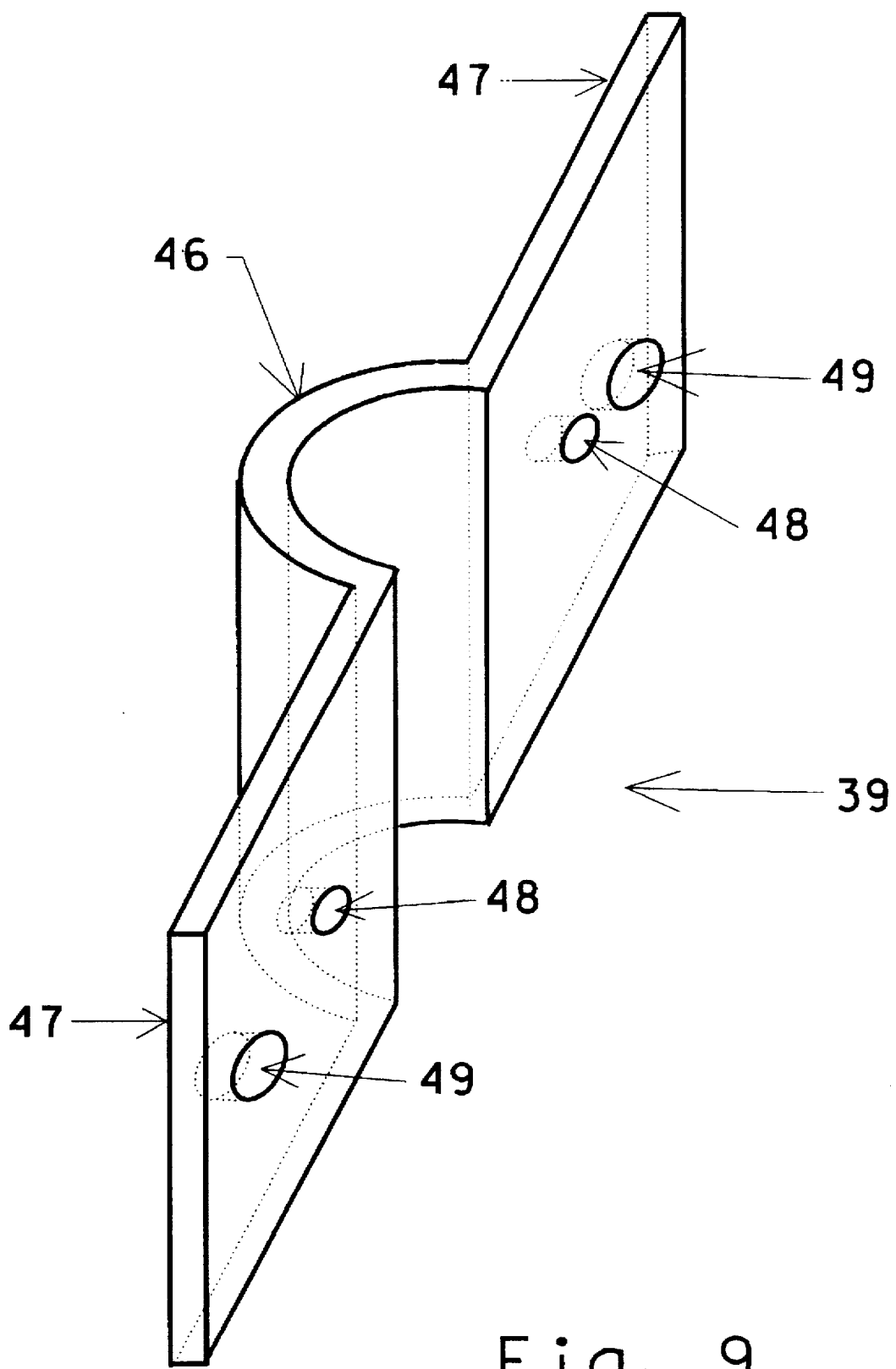
Figure 10:
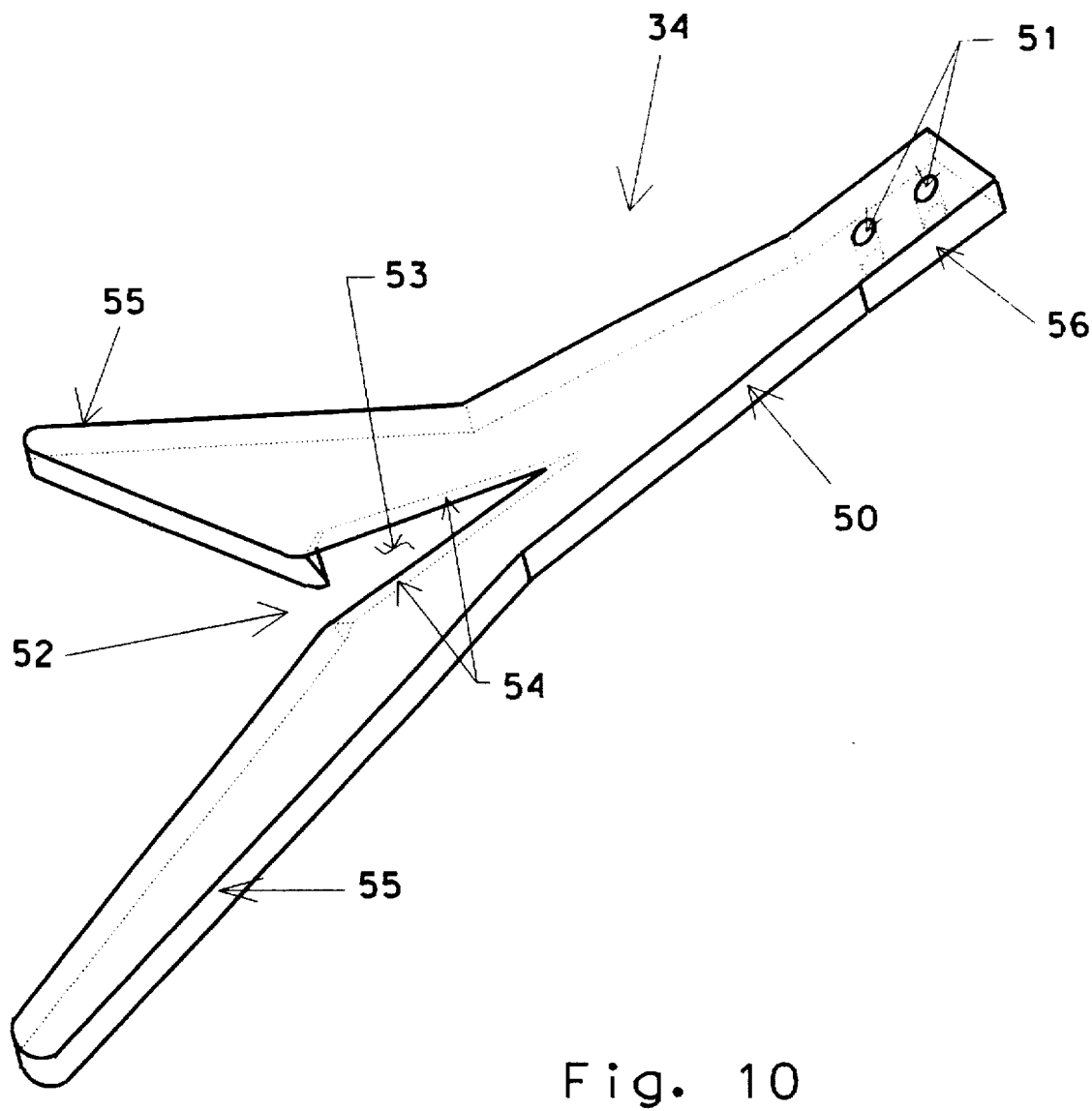
Figure 11:
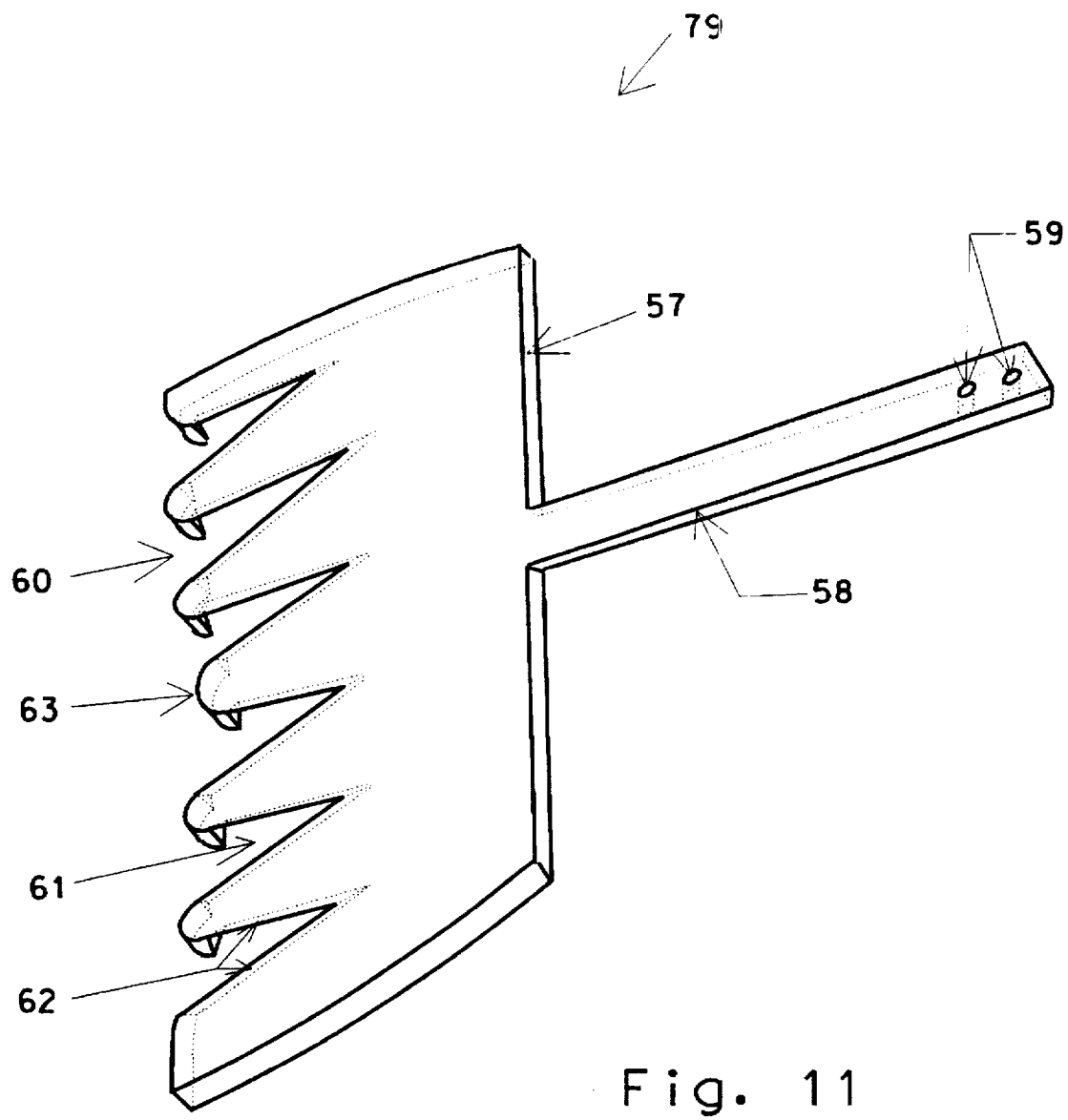

FIGS. 8, 9, 10 and 11 are perspective views of some of the components of the invented devices shown in FIGS. 7, 14 and 15. FIGS. 8 and 9 are the top portion and the bottom portion of a cutter mounting device, respectively. FIGS. 10 and 11 show the cutters with one cutting wedge and with multiple cutting wedges, respectively.

Figure 12:
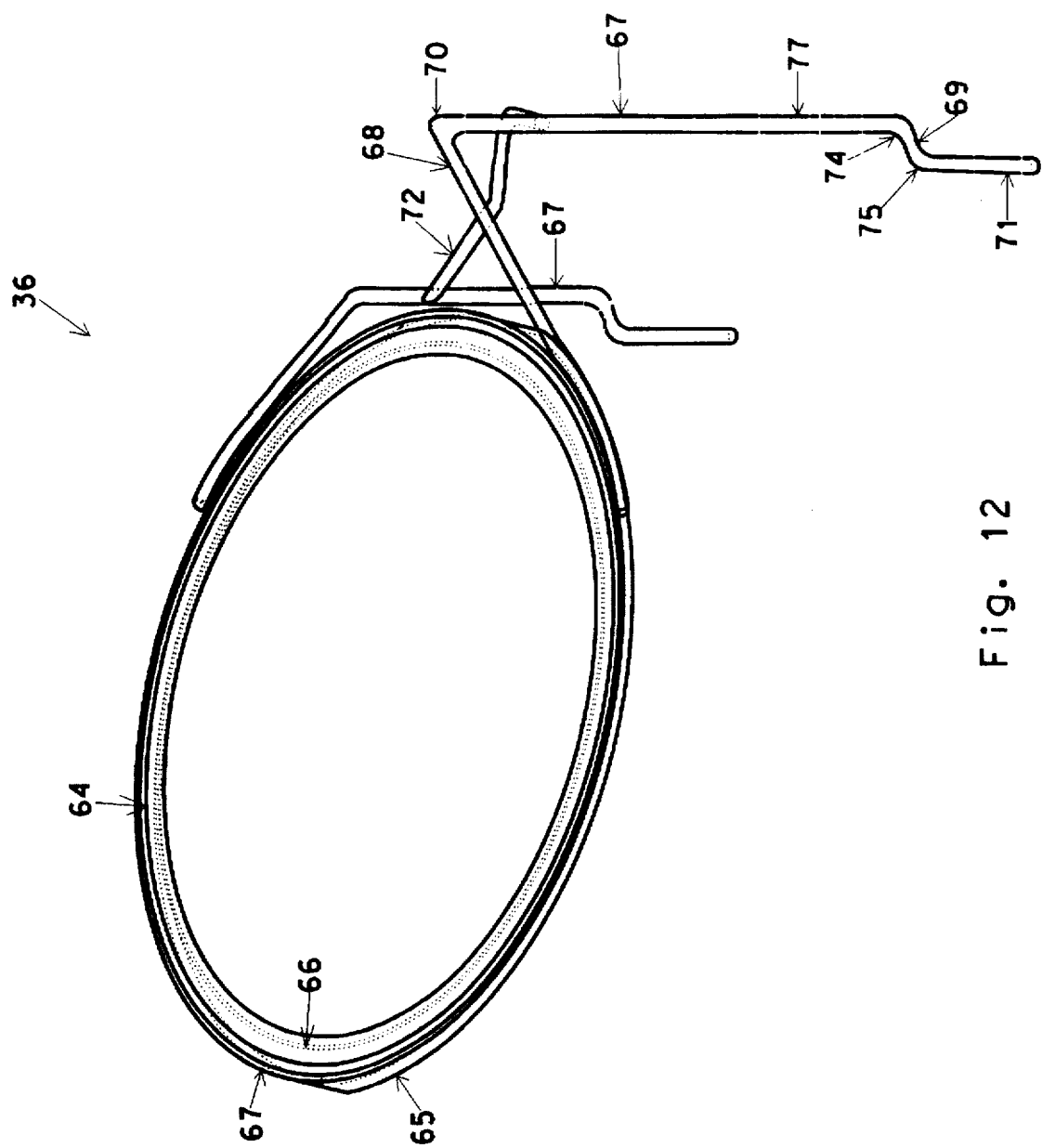
Figure 13:
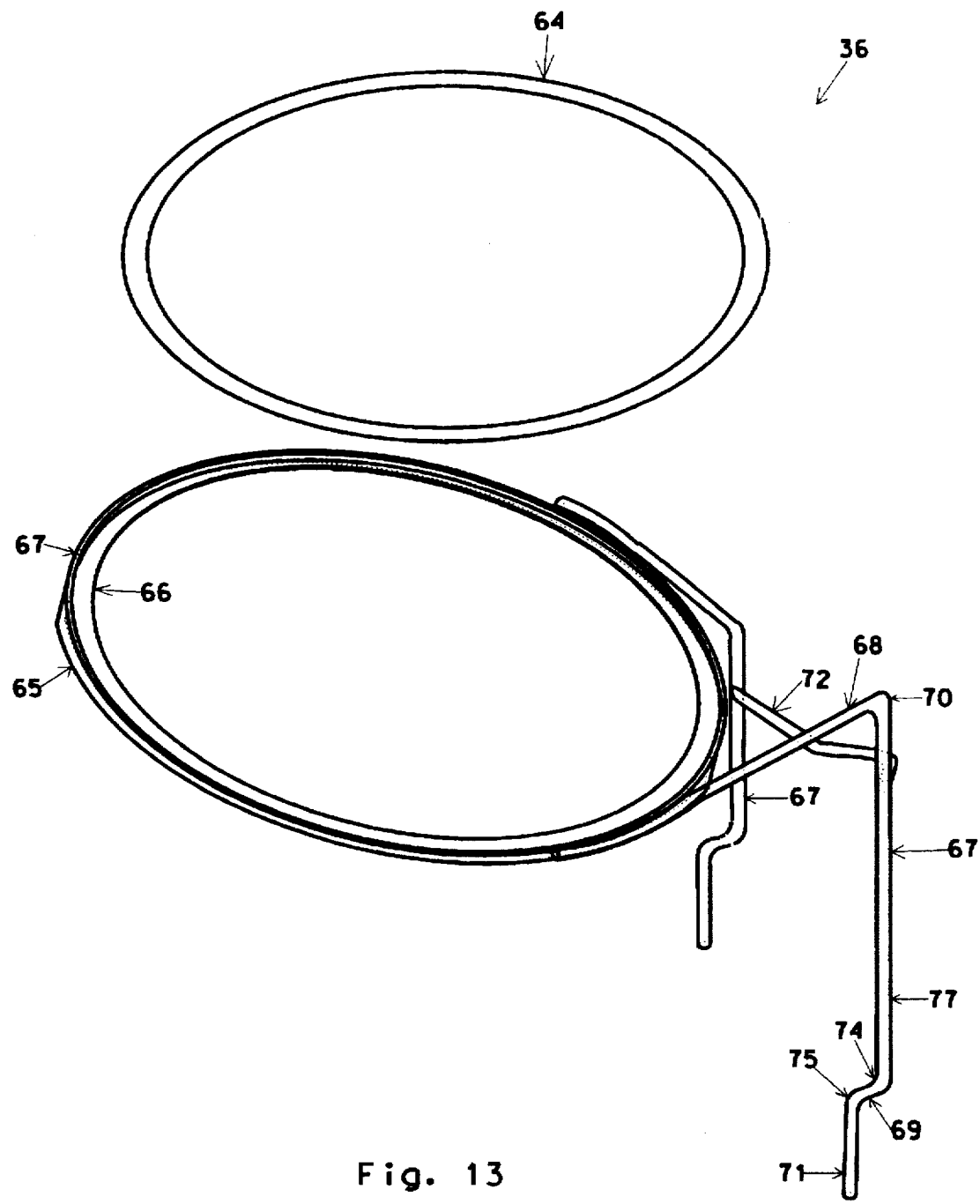

FIGS. 12 and 13 are perspective views of the bag/net mounting device and a bag/net ring both of which are components of the invented device shown in FIG. 7. FIG. 12 shows the bag/net ring is engaged with the bag/net mounting device. FIG. 13 shows that the bag/net ring is separated from the bag/net mounting device.

Figure 18:
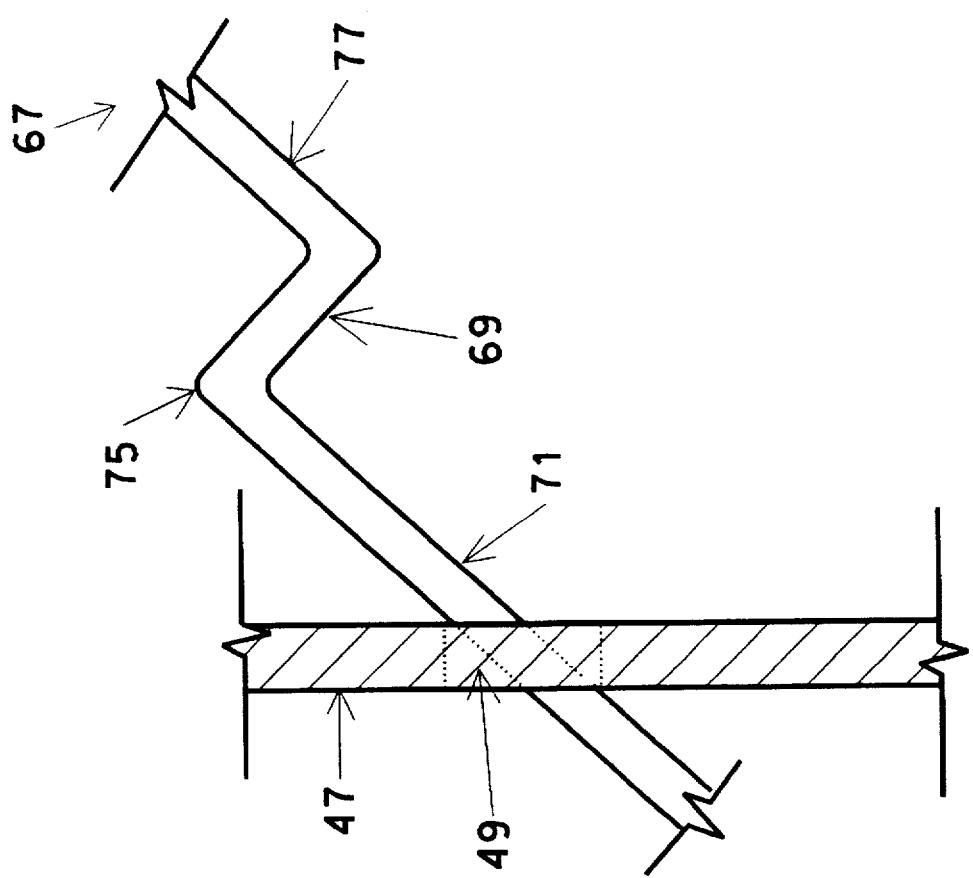

FIGS. 16, 17 and 18 illustrate sequentially of dismounting a mounting leg of a bag/net mounting device off a cutter mounting device. FIGS. 18, 17 and 16 illustrate sequentially of mounting a mounting leg of a bag/net mounting device onto a cutter mounting device.

Figure 19:
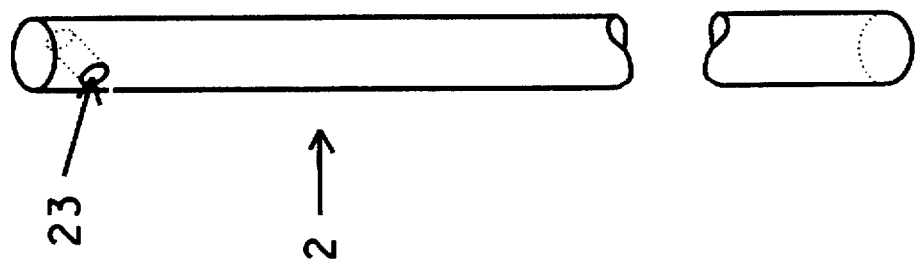

FIG. 19 is a perspective view of a typical pole for the invented fruit picker of the first kind.

FIG. 20 is a perspective view of the cutter with only one cutting wedge for the invented device shown in FIG. 1.

Figure 21:
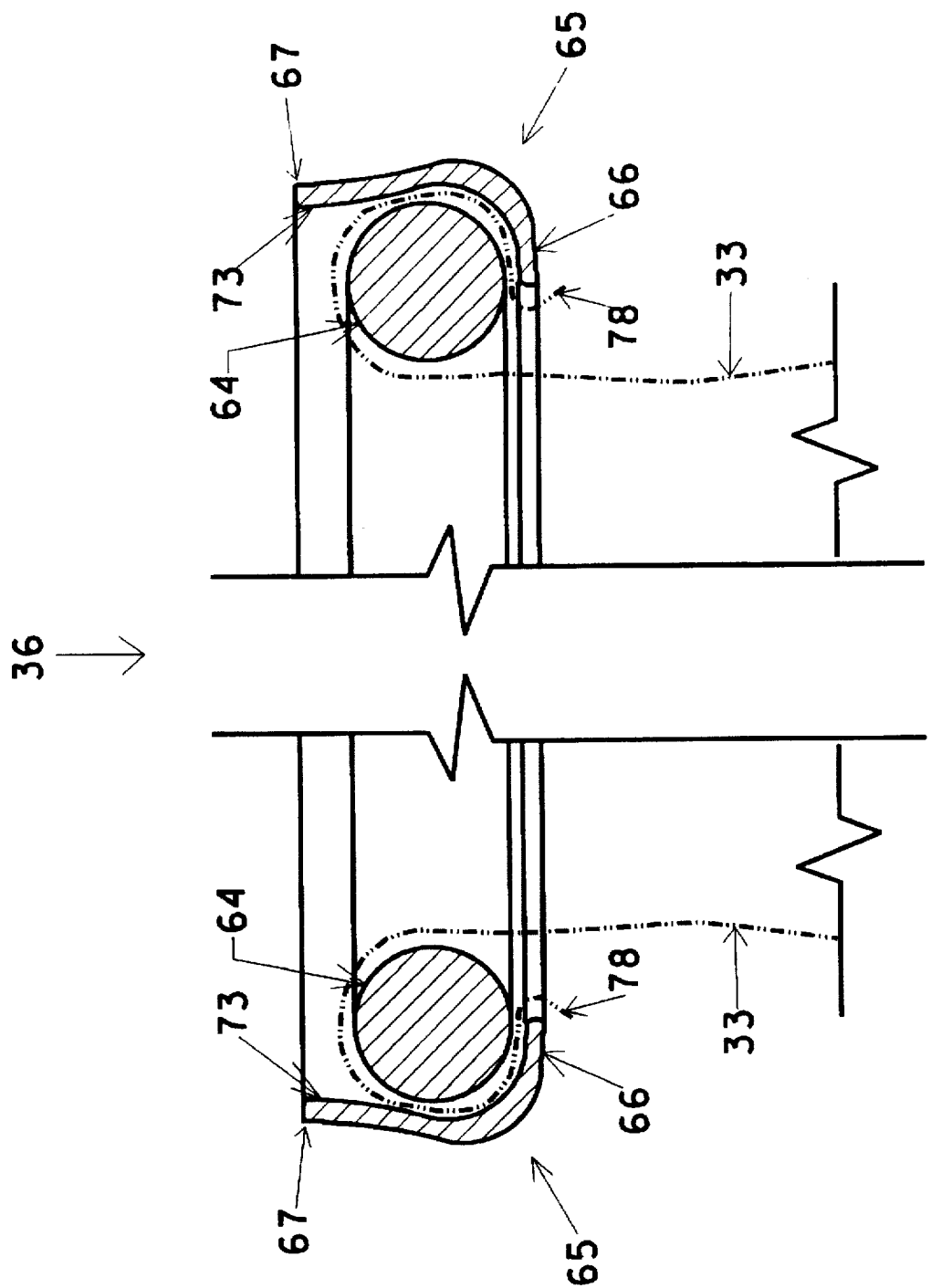
Figure 22:
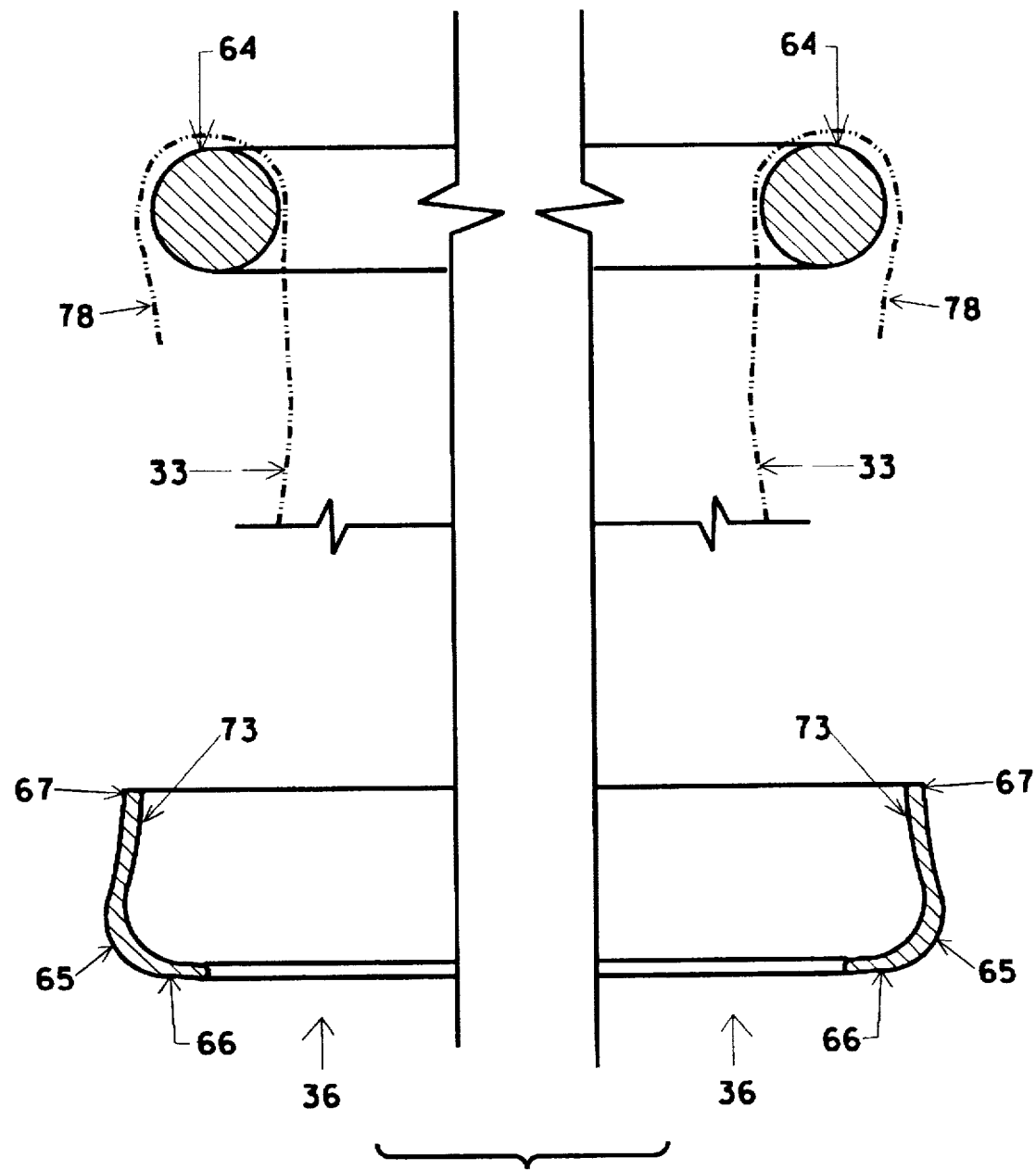

FIGS. 21 and 22 are sectional views which together illustrate the function of the bag/net ring of the bag/net mounting device as shown in FIG. 7. FIG. 21 illustrates that a bag or a net is held in place by the bag/net ring. FIG. 22 shows that the bag or the net is not mounted onto the bag/net mounting device.

Figure 23:
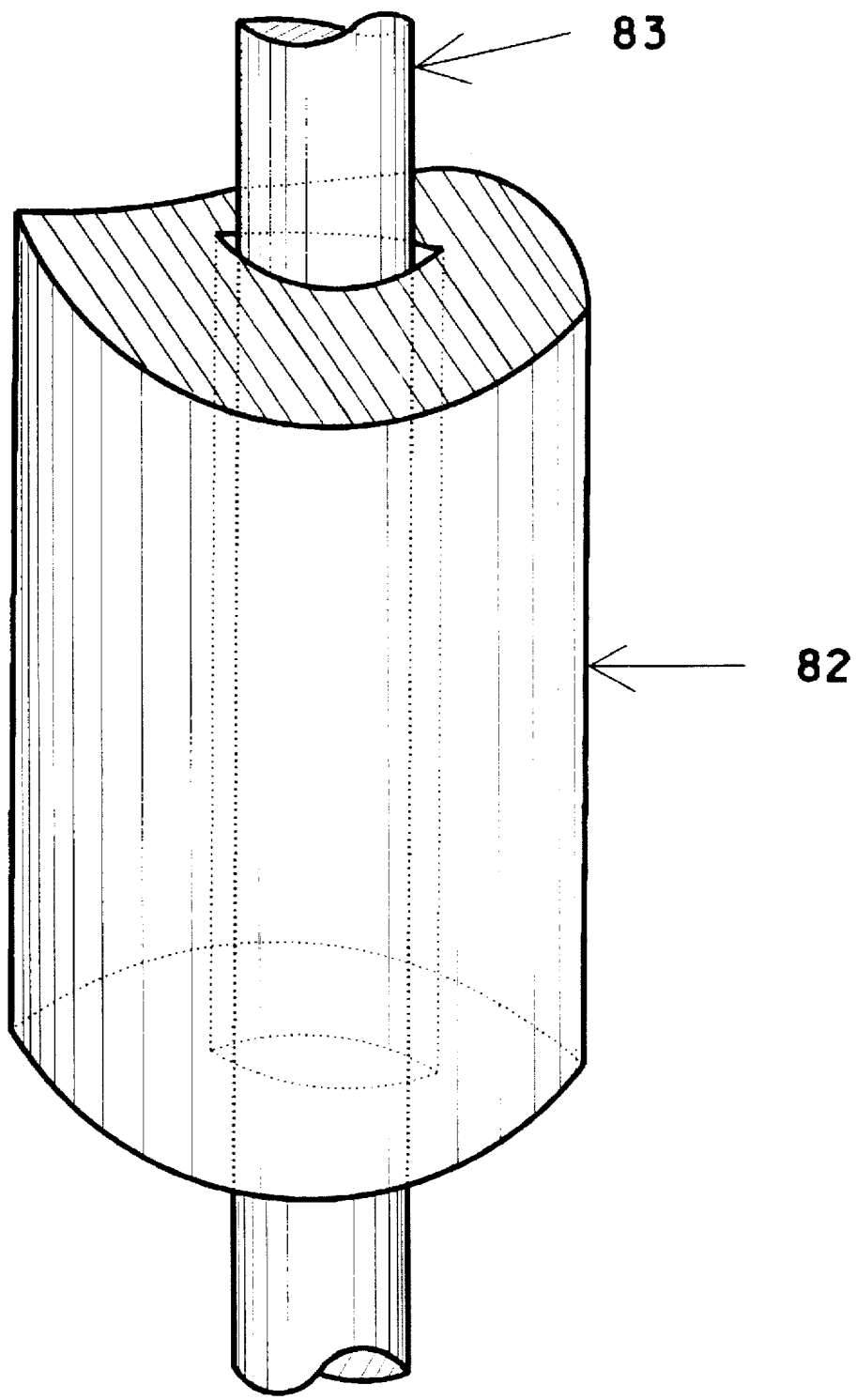

FIG. 23 is a perspective view which illustrates a layer of soft cushion material is mounted around a rod of the wire mesh of a basket.

GENERAL DESCRIPTION

Two kinds of invented fruit pickers are introduced herein. Each kind consists of a fruit stem cutting device and a temporary fruit holding device. Both devices are mounted on top of a pole. The first kind fruit picker has a rigid basket as the temporary fruit holding device. The second kind of them has a flexible bag or net as the temporary fruit holding device. A variation of the second kind of them has a removable temporary fruit holding device.

Figure 2:
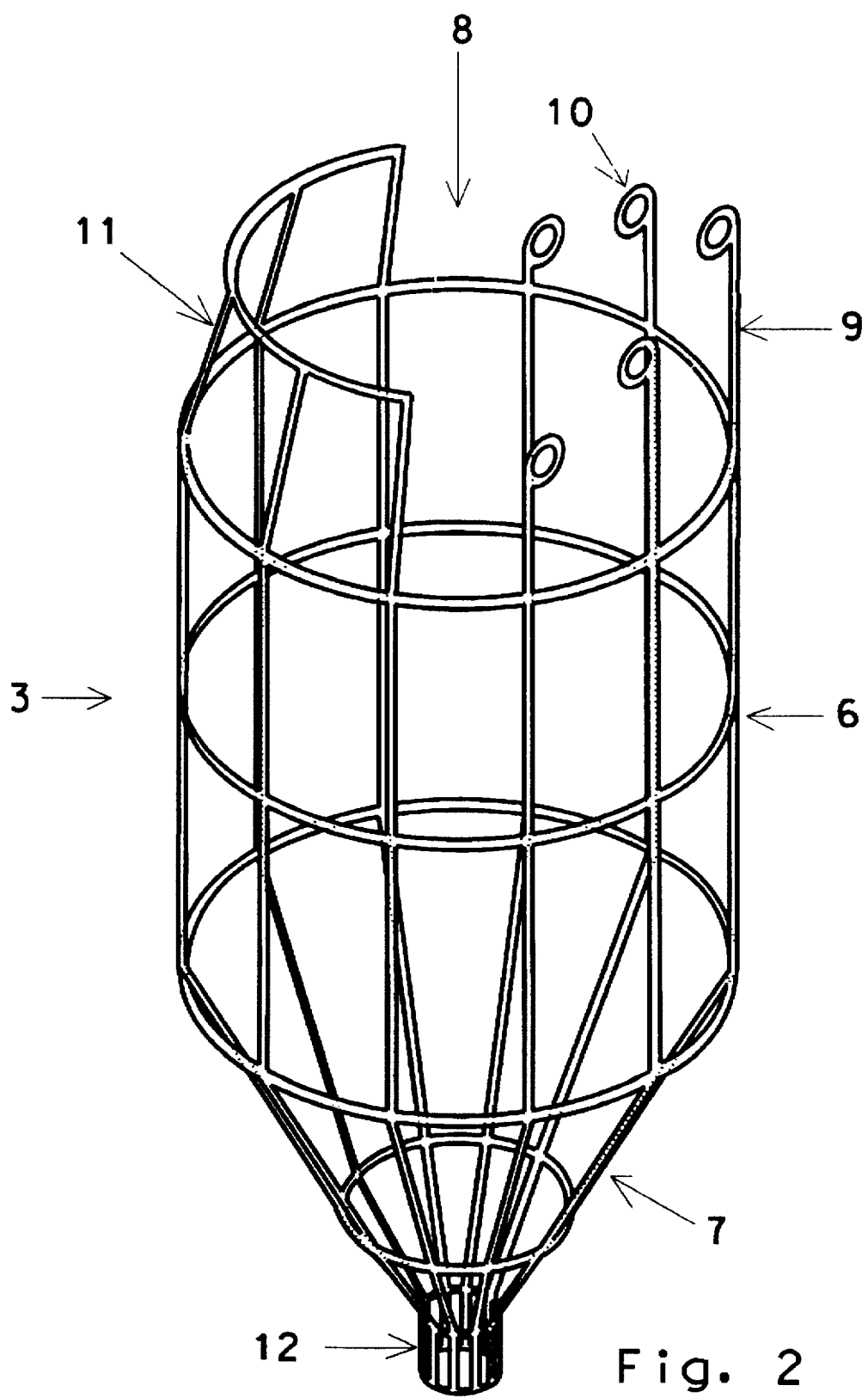
FIG. 2 is a perspective view of the basket of the invented device shown in FIG. 1.
Figure 3:
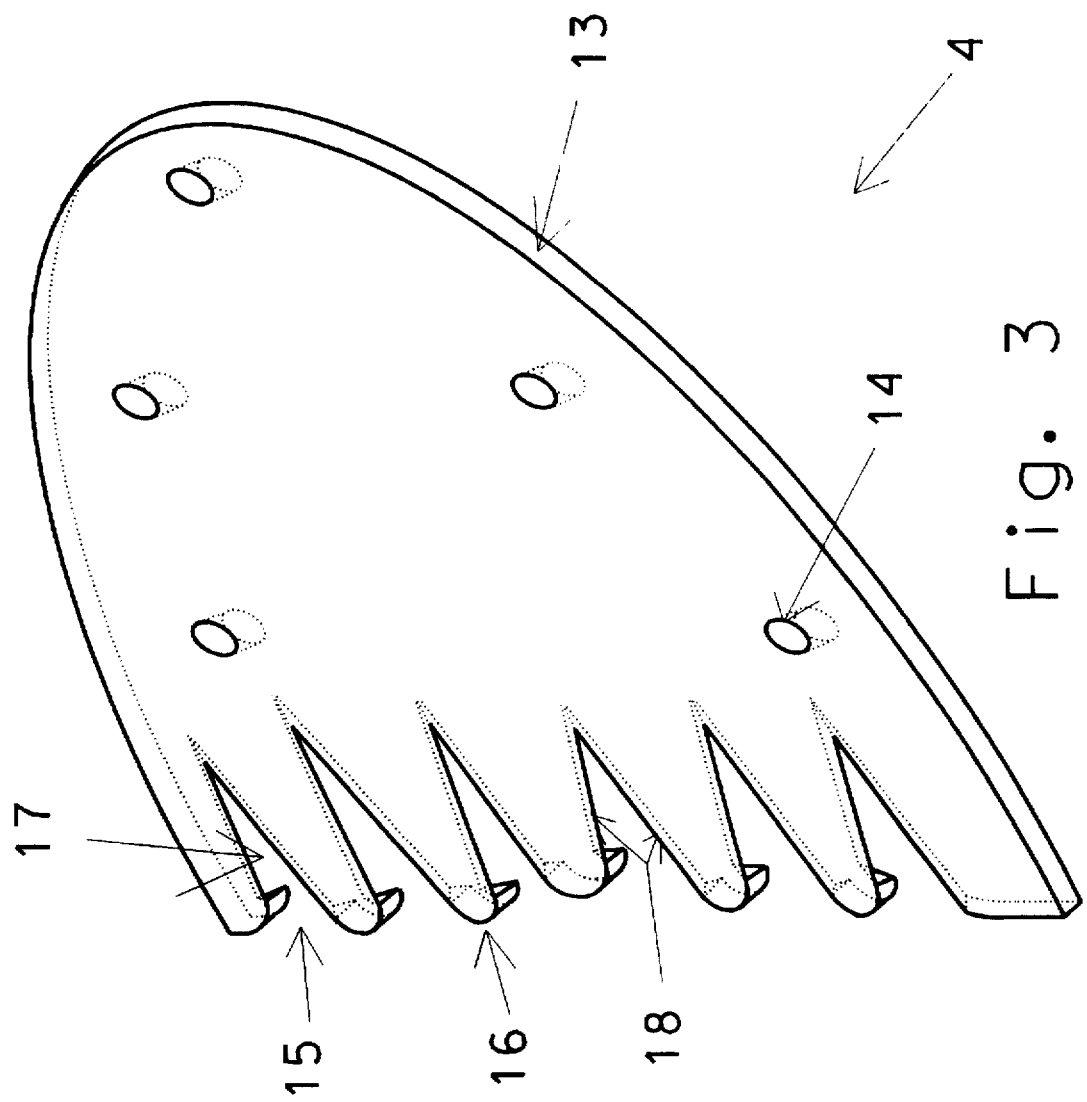
FIG. 3 is a perspective view of the cutter with multiple cutting wedges for the invented device shown in FIG. 1.

Referring to FIG. 1 for the first kind of the invented apparatus, a fruit picker 1 consists of a pole 2, a basket 3, a cutter 4, several cutter mounting devices 5, typically, and a basket/pole mounting device 22. Referring to FIG. 19, the pole typically is a wood or metal pole with at least a hole 23 near one of its ends. The cutter mounting devices and the basket/pole mounting device can be any fastening means such as rivets or bolts, nuts and washers. Referring to FIG. 2, the basket 3 is a metal wire-meshed cage-like elongated container which has side walls 6, a closed end 7, and an open end 8. The side walls and the closed end are wire meshes. Near the center of the closed end is a mounting hub 12 which is a tube-like wire mesh and which can engage with the end of the pole which has the hole 23 on it. The side walls near the open end consists of two approximately equal distinctive portions, the straight wire portion 9 and the bent wire portion 11. The wires of the wire mesh of the bent wire portion 11 are bent slightly inward. The wires of the wire mesh of the straight wire portion 9 are generally straight except some of the wires have bent eyes 10, typically, at their ends. The ends of the wires of the straight wire portion lay on an imaginary plane which intercepts the side walls 6 with a relatively sharp angle. Referring to FIG. 3, the cutter 4 is a metal plate, the cutter plate 13. There are several holes, the mounting holes 14, on the cutter plate 13. There are many cutting wedges 15 on one edge of the cutter plate. A cutting wedge is a wedge-shaped knife 17 which recesses from the edge of the cutter plate 13. Each of the wedge-shaped knife consists of two knife edges 18 which can be ordinary knife edges or serrated edges. These two knife edges intersect each other in a sharp angle so that together they form the wedge-shaped knife. There is a round nose 16, typically, between two adjacent wedge-shaped knifes. The round nose is a rounded surface of the cutter plate. The round nose is not a knife edge.

Referring to FIG. 20, an alternative of the cutter 4 is the cutter plate 24 which is a metal plate. There are several holes, the mounting holes 25, typically, on the cutter plate 24. There is a cutting wedge 26 on one edge of the cutter plate. The cutting wedge is a wedge-shaped knife 27 which recesses from the edge of the cutter plate 24. The wedge-shaped knife consists of two knife edges 28 which can be ordinary knife edges or serrated edges. These two knife edges intersect each other in a sharp angle so that together they form the wedge-shaped knife. There is a fruit stem guide 29 at each mouth of the wedge-shaped knife. The fruit stem guide is a inward slant edge of the cutter plate. The fruit stem guide is not a knife edge.

Referring to FIG. 1 for the construction of the first kind invented fruit picker. The cutter is mounted onto the end of the straight wire portion 9 with each cutter mounting device 5 penetrating the mounting eye 10, referring to FIG. 2, and the mounting hole 14, referring to FIG. 3, or 25 for the alternative cutter shown in FIG. 20, and fastening them together. The cutter plate replaces the aforementioned imaginary plane at the end of the straight wire portion. The cutter plate's edge, which has the cutting wedges/wedge, faces the interior of the basket 3. The mounting hub 12 engages with the pole's end which has the hole 230. The basket/pole mounting device 22 penetrates the mounting hub and the hole 23, referring to FIG. 19, of the pole and fastens them together.

Referring to FIG. 4, in using the first kind invented fruit picker 1 with the cutter shown in FIG. 3, a user 19 will hold the pole 2 and raise it to reach a fruit 20 on a tree. The user will manipulate the pole so that the fruit 20 passes through the bent wire portion 11 and the cutting wedges 15 and stays inside the basket 3. Referring to FIG. 5, the user then will jerk down the basket along the direction 21. In doing so, the stem 23 of the fruit will be guided by the round nose 16 into one of the cutting wedges. When the move continued, the stem 23 will be forced into the wedge-shaped knife 17 and be cut. Referring to FIG. 6, after the stem 23 is cut, the fruit 20 will fall and stay inside the basket 3.

The user may follow the same above doings to pick up another fruit. Or, the user may remove the picked-up fruits from the basket by picking or dumping them out of the basket. The bent wire portion of the basket may help to keep the fruits from accidently dropping out of the basket when the user is targeting other fruits to pick.

The above procedures can be used for the first kind invented fruit picker with the alternative cutter shown in FIG. 20. The only deviation from the above procedures is that the stem of the fruit will be guided by the fruit stem guide 29, referring to FIG. 20, toward the wedge-shaped knife, instead of by the round nose 16, referring to FIG. 3, for the cut.

Referring to FIG. 23, a layer of soft cushion material 82 can be mounted around each rod 83 of the wire mesh of a basket. A fruit picker with a basket mounted with the soft cushion material can handle sensitive and fragile fruits since they are protected during operation of the basket.

Referring to FIG. 7 for the second kind of the invented apparatus. A fruit picker 31 consists of a pole 32, a bag or a net 33, a cutter 34, a cutter mounting device 35, a bag/net mounting device 36, and several fastening means 37 and 37a. The fastening means are any suitable fastening devices such as rivets or bolts, nuts and washers. The pole typically is a wood or metal pole. The bag is a bag made of any suitable transparent material such as plastic. A net is any suitable net.

Referring to FIGS. 8 and 9, the cutter mounting device 35, referring to FIG. 7, consists of a top portion 38 and a bottom portion 39. Referring to FIG. 8, the top portion of the cutter mounting device has a base 40 which is a curved plate. Two ears 44, which are short plates, extrude from the two opposite straight edges of the base. There are fastening means holes 45 which are holes on the ears 44. A nose 41 extrudes longitudinally along a curved edge of the base 40. The nose is a flat and/or curved plate. A nose plate 42, which is a short plate, extrudes from the end of the nose 41. There is a sharp angle between the nose plate and the nose. There are several fastening means holes 43 which are hole on the nose plate. Referring to FIG. 9, the bottom portion of the cutter mounting device has a base 46 which is a curved plate. Two ears 47, which are short plates, extrude from the two opposite straight edges of the base. There are fastening means holes 48 which are holes on the ears 47. There is a mounting leg hole 49, which is a hole, near the edge of each ear. These two mounting leg holes will not be blocked by the ears of the top portion of the cutter mounting device because the ears of the bottom portion of the cutter mounting device are longer than those of the top portion.

Referring to FIG. 10, the cutter 34 is a "Y"-shaped metal plate, the cutter plate 50. There are several holes, the fastening holes 51, near the end of the foot 56 of the "Y"-shaped cutter plate. There is a cutting wedge 52 between the two arms 55 of the "Y"-shaped cutter plate. The cutting wedge is a wedge-shaped knife 53 which recesses into the cutter plate. The wedge-shaped knife consists of two knife edges 54 which can be ordinary knife edges or serrated edges. These two knife edges intersect each other in a sharp angle so that together they form the wedge-shaped knife.

Referring to FIG. 11, an alternative of the cutter 79 consists of a cutter plate 57 and a handle 58. The cutter plate is a metal plate which has many cutting wedges 60, typically, on one edge of the cutter plate. A cutting wedge is a wedge-shaped knife 61, typically, which recesses from the edge of the cutter plate 57. Each of the wedge-shaped knife consists of two knife edges 62, typically, which can be ordinary knife edges or serrated edges. These two knife edges intersect each other in a sharp angle so that together they form the wedge-shaped knife. There is a round nose 63, typically, between two adjacent wedge-shaped knifes. The round nose is a rounded surface of the cutter plate. The round nose is not a knife edge. The handle 58 is a metal stripe which extrudes from the edge of the cutter plate and which lays on the opposite side of the cutting wedges. There are several holes, the fastening holes 59 near the free end of the handle.

Referring to FIGS. 7, 12 and 13, the bag/net mounting device 36 consists of a bag/net ring 64, a ring holder 65, two mounting legs 67, and a mounting leg tie 72. A bag/net ring is a ring of any suitable shape and crosssection. A round bag/net ring with circular crosssection is shown. A ring holder has the same shape as the bag/net ring. Referring to FIGS. 21 and 22, the ring holder 65 has "L"-shaped crosssection and consists of a ring seat 66 and a ring guard 67. The ring seat and the ring guard are the horizontal limb and the vertical limb, respectively, of the "L"-shaped crosssection. The upper portion of the ring guard 73 is bent slightly towards the ring seat. The bag/net ring can be put on the ring seat. Referring to FIG. 12, the mounting leg 67 is a rod with at least three bends, the bands 70, 74 and 75. The bends divide the mounting leg into at least four portions, the short limb 68, the long limb 77, the short leg 69, and the tail end 71. The bend 70 connects the short limb 68 and the long limb 77. The bend 74 connects the long limb 77 and the short leg 69. The bend 75 connects the short leg 69 and the tail end 71. The short limb, the long limb, the short leg and the tail end are on an imaginary plane. The short limb and the short leg are on the same side of the long limb. The mounting leg tie 72 is a bent rod which each end connects to the long limb of each of the mounting leg 67. The ring holder 65 is mounted on both of the short limbs of both of the mounting legs. A sharp imaginary angle is formed by the two imaginary planes which are formed by the two mounting legs.

Referring to FIGS. 7 though 10 for the construction of the second kind invented fruit picker. The cutter mounting device 35 will be mounted onto an end of the pole 32 by clamping the top portion 38 and the bottom portion 39 of the cutter mounting device 35 onto the end of the pole. The fastening means 37 will penetrate the fastening means holes 45 and 48 of the ears 44 and 47 of the top portion and the bottom portion, respectively, of the cutter mounting device and fasten them together. When the cutter 34 shown in FIG. 10 is used, the cutter 34 will be mounted on the nose plate 42 of the cutter mounting device. The fastening means 37a will penetrate the fastening holes 43 and 51 of the nose plate 42 and the cutter 34, respectively, and fastening the nose plate and the cutter mounting device together. The bag/net mounting device 36 will be mounted onto the cutter mounting device 35. The bag or net 33 will be mounted onto the bag/net mounting device 36. Referring to FIG. 15, when the alternative cutter shown in FIG. 11 is used, the cutter 79 will be mounted on the nose plate 42 of the cutter mounting device. The fastening means 37b will penetrate the fastening holes 43 and 59, referring to FIGS. 8 and 9, of the nose plate 42 and the cutter 79, respectively, and fastening the nose plate and the cutter mounting device together.

Referring to FIGS. 16, 17 and 18 for dismounting or mounting, sequentially or reverse sequentially, respectively, of the bag/net mounting device off/onto the cutter mounting device. In mounting, referring to FIG. 18, the user needs to till up the mounting leg 67 and let the tail end 71 penetrate the mounting leg hole 49 of the bottom portion of the cutter mounting device 47. Then the user needs to change the tilled-up angles of the mounting leg 67 so that the bend 75 passes through the mounting leg hole 49, referring to FIG. 17. The short leg 69 will partially penetrate the mounting leg hole 49 and rest in it, referring to FIG. 16. The mounting leg 67 will be kept in place by the reaction forces generated on a portion of the long limb 77, the short leg 69 and the tail end 71 when they are against the ear 47. In dismounting, the user will do the reverse procedures, i.e. to till up the mounting leg 67, referring to FIG. 16, to let the bend 75 pass through the mounting leg hole 49, referring to FIG. 17, and to let the tail end 71 be off the ear 47, referring to FIG. 18.

Unlike the aforementioned mounting legs which has at least three bends and four segments, an alternative of the mounting leg consists of only one bend and two segments, the short limb and the long limb. One end of the short limb connects with the ring holder. The bend connects the short limb and the long limb. The free end of the long limb connects with the cutter mounting device. The connection or the mounting can be done by any traditional readily available means such as welding, bolting, or clamping. The bolting or the clamping requires slight modifications of the ears of the top portion and/or the bottom portion of the cutter mounting device. Since the connection or mounting means is believed to be clearly understood, no sketch or drawing is provided in this specifications.

Referring to FIG. 22, in mounting a bag or a net on the bag/net mounting device, the rim 78 of a bag or a net 33 will be wrapped on the bag/net ring 64 firstly. The rim 78 will be put on the exterior side of the bag/net ring 64. Referring to FIG. 21, the bag/net ring 64 then will be pushed into the ring holder 65. The bag/net ring 64 and the rim 78 of a bag or a net will pass through the upper portion 73 of the ring guard 67 and be on the ring seat 66. The rim 78 of a bag or a net 33 will be clamped together by the ring seat 66 and the bag/net ring 64.

Referring to FIGS. 21 and 22, when there are some picked-up fruits in the bag or net, the weights of the fruits will pull downward the bag or net. The weights will generate additional forces on the bag/net ring 64. The bag/net ring will then generate additional forces on the ring seat 66. Therefore, the more weights the picked fruits in the bag or net are, the more clamping forces will it be on the rim 78 of a bag or a net. The bag or the net will be tightly clamped in place by the bag/net ring 64 and the ring holder 65. To dismount the bag or the net, the user will need to firstly put the fruits loaded bag or net on a supporting surface so that the weights of the picked fruits will not be loaded on the bag/net ring. Then the user needs to push the bag/net ring away from the ring holder. The user then can slide the bag or net away from the bag/net ring. The user then will have a bag or net loaded with picked fruits.

Referring to FIG. 14, in lieu of using a bag/net ring and a ring holder at the ends of the short limbs of the mounting legs of the bag/net mounting device to hold a bag or a net, a net ring 80 can be used for mounting a net 81. The net ring is a ring of any suitable shape and crosssection. A round net ring is shown in FIG. 14. The net is a woven net which free strands 81a, typically, are fastened onto the net ring.

The uses of the second kind invented fruit picker are similar to those described previously for the first kind invented fruit picker. In the uses, a user holds the pole and raises it to reach a fruit on a tree. The user then manipulates the pole so that the fruit is hanging in the bag or the net while the stem of the fruit is near the cutting wedge. The user then will jerk or swing the invented fruit picker along a direction such that the stem of the fruit will be guided into the cutting wedge by either the arms of the cutter plate or the round noses of the cutting edges, depending on which cutter is installed on the cutter mounting device. When the move continued, the stem will be forced into the wedge-shaped knife and be cut. After the stem is cut, the fruit will fall and stay inside the bag or the net. The user may follow the same procedures to pick up another fruit. Or, the user may remove the picked-up fruits together with the bag or the net when the device shown in FIG. 7 is used. With this device, the user may reinstall a new bag or a net for his/her continuous uses of the device. The procedures of removal and reinstallation of the bag or the net will be the same as those described previously for dismounting and mounting of a bag or a net. If a device shown in FIG. 14 is used, the user may remove the picker-up fruits from the net instead.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

I claim:

1. A fruit picker comprising:
   a) a pole;
   b) a cutter mounting device;
   c) one end of said pole connecting to one edge of said cutter mounting device;
   d) a cutter, which is a plate having a cutting wedge on one edge and a narrowed section on opposite edge;
   e) said cutting wedge consisting of at least a knife edge;
   f) said narrowed section of said cutter connecting to said cutter mounting device on the edge which is opposite to the edge where said pole connects with said cutter mounting device;
   g) a fruit holder mounting device, which has a top frame and a bottom frame;
   h) said bottom frame being mounted on one end of at least a mounting leg;
   i) the other end of said mounting leg connecting to said cutter mounting device;
   j) said bottom frame of said fruit holder mounting device having "L"-shaped crosssection;
   k) said top frame of said fruit holder mounting device being able to engage with said "L"-shaped crosssection of said bottom frame of said fruit holder mounting device;
   l) and a fruit holder, which is a holder made of flexible material and which is clamped onto said fruit holder mounting device by said top frame and said bottom frame of said fruit holder mounting device.

2. The combination of claim 1 wherein said fruit holder is a net.

3. The combination of claim 2 wherein an arm extends outwardly from each exterior edge of said cutting wedge of said cutter.

4. The combination of claim 1 wherein at least one rod connects said two adjacent mounting legs of said fruit holder mounting device.

5. A fruit picker comprising:
   a) a pole;
   b) a cutter mounting device;
   c) one end of said pole connecting to one edge of said cutter mounting device;
   d) a cutter, which is a plate having at least a cutting wedge on one edge and a narrowed section on opposite edge;
   e) said cutting wedge consisting of at least a knife edge;
   f) said narrowed section of said cutter connecting to said cutter mounting device on the edge which is opposite to the edge where said pole connects with said cutter mounting device;
   g) a fruit holder mounting device, which has a top frame and a bottom frame;
   h) said bottom frame being mounted on one end of at least a mounting leg;
   i) the other end of said mounting leg connecting to said cutter mounting device;
   j) said bottom frame of said fruit holder mounting device having L-shaped crosssection;
   k) said top frame of said fruit holder mounting device being able to engage with said L-shaped crosssection of said bottom frame of said fruit holder mounting device;
   l) and a fruit holder, which is a holder made of flexible material and which is clamped onto said fruit holder mounting device by said top frame and said bottom frame of said fruit holder mounting device.

6. The combination of claim 5 wherein said fruit holder is a net.

7. The combination of claim 5 wherein there is a rounded edge between two neighboring said cutting wedges.

8. The combination of claim 5 wherein at least one rod connects said two adjacent mounting legs of said fruit holder mounting device.

9. A fruit picker comprising:
   a) a pole;
   b) a cutter mounting device;
   c) one end of said pole connecting to one edge of said cutter mounting device;
   d) a cutter, which is a plate having a cutting wedge on one edge and a narrowed section on opposite edge;
   e) said cutting wedge consisting of at least a knife edge;
   f) said narrowed section of said cutter connecting to said cutter mounting device on the edge which is opposite to the edge where said pole connects with said cutter mounting device;
   g) a fruit holder mounting device, which has a frame mounted on one end of at least a mounting leg;
   h) the other end of said mounting leg connecting to said cutter mounting device;
   i) and a fruit holder, which is a net which top strands are mounted onto said frame of said fruit holder mounting device.

10. The combination of claim 9 wherein an arm extends outwardly from each exterior edge of said cutting wedge of said cutter.

11. The combination of claim 9 wherein at least one rod connects said two adjacent mounting legs of said fruit holder mounting device.

12. A fruit picker comprising:
   a) a pole;
   b) a cutter mounting device;
   c) one end of said pole connecting to one edge of said cutter mounting device;

d) a cutter, which is a plate having at least a cutting wedge on one edge and a narrowed section on opposite edge;

e) said cutting wedge consisting of at least a knife edge;

f) said narrowed section of said cutter connecting to said cutter mounting device on the edge which is opposite to the edge where said pole connects with said cutter mounting device;

g) a fruit holder mounting device, which has a frame mounted on one end of at least a mounting leg;

h) the other end of said mounting leg connecting to said cutter mounting device;

i) and a fruit holder, which is a net which top strands are mounted onto said frame of said fruit holder mounting device.

13. The combination of claim 12 wherein an arm extends outwardly from each exterior edge of said cutting wedge of said cutter.

14. The combination of claim 12 wherein at least one rod connects said two adjacent mounting legs of said fruit holder mounting device.

* * * * *